United States Patent [19]

Arnstein et al.

[11] Patent Number: 5,379,445
[45] Date of Patent: Jan. 3, 1995

[54] AUTOMATIC GAIN CONTROL FOR REDUCING EFFECTS OF JAMMING

[75] Inventors: Donald S. Arnstein, Fairfax; Jong W. Lee, Herndon, both of Va.

[73] Assignee: Comsat, Bethesda, Md.

[21] Appl. No.: 786,834

[22] Filed: Nov. 1, 1991

[51] Int. Cl.$^6$ ............................................. H04B 1/16
[52] U.S. Cl. ..................... 455/13.4; 342/16; 342/353; 455/33.1; 455/235.1; 455/303; 455/311; 455/341; 327/331; 327/551
[58] Field of Search ............... 455/1, 12.1, 13.4, 63, 455/235.1, 245.1, 249.1, 252.1, 295, 296, 303, 305, 306, 308, 311, 341, 283, 291, 293, 33.1; 328/115, 162, 164, 165; 342/16, 17, 19, 91, 92, 352, 353

[56] References Cited

U.S. PATENT DOCUMENTS

| | | | |
|---|---|---|---|
| 3,916,406 | 10/1975 | Miller et al. | |
| 4,250,458 | 2/1981 | Richmond et al. | 329/112 |
| 4,355,414 | 10/1982 | Inoue | 455/184.1 |
| 4,418,363 | 11/1983 | Kelleher | 358/336 |
| 4,590,600 | 5/1986 | Beeman et al. | 375/99 |
| 4,710,723 | 12/1987 | Pelchat et al. | 455/296 |
| 4,739,518 | 4/1988 | Bickley et al. | 455/296 |
| 4,907,293 | 3/1990 | Ueno | 455/295 |
| 4,947,256 | 8/1990 | Wood et al. | 358/183 |
| 4,955,077 | 9/1990 | Sugayama | 455/197.1 |

FOREIGN PATENT DOCUMENTS

0181239  7/1989  Japan ................... 455/13.4

OTHER PUBLICATIONS

Nelson M. Blachman, "Bandpass nonlinearities," IEEE Trans. on Information Theory, vol. IT-10, Apr. 1964, pp. 162-164.

Donald S. Arnstein, "Power Division in Spread Spectrum Systems with Limiting," IEEE Transactions on Communications, vol. Com-27, No. 3, 1979.

P. W. Baier and K. J. Friederichs, "A Nonlinear Deivce to Suppress Strong Interfering Signals with Arbitrary Angle Modulation in Spread-Spectrum Receivers," IEEE Transactions on Communications, vol. Com-33, No. 3, Mar. 1985.

Laurence B. Milstein, "Interference Rejection Techniques in Spread Spectrum Communications," Proceedings of the IEEE, vol. 76, No. 6, Jun. 1988.

Ryuji Kohno et al., "Combination of an Adaptive Array Antenna and a Canceller of Interference for Direct-Sequence Spread-Spectrum Multiple-Access System," IEEE Journal on Selcted Areas in Communications, vol. 8, No. 4, May 1990.

Ye Hua and Wu Bo-Xiu, "A Robust Adaptive Filtering Algorithm with Variable Step Size," MILCOM '89 Session on Interference Suppression, Bedford, Mass. (Oct. 1989).

Young Kil Kwag, "An Adaptive Clutter and Interference Suppression with a Minimum Residue Noise Power," MILCOM '89 Session on Interference Suppression, Bedford, Mass. (Oct. 1989).

(List continued on next page.)

Primary Examiner—Reinhard J. Eisenzopf
Assistant Examiner—Chi Pham
Attorney, Agent, or Firm—Sughrue, Mion, Zinn, Macpeak & Seas

[57] ABSTRACT

Improved automatic gain control for an amplifier is obtained by controlling the size of a null zone in a drive signal for the amplifier. The size of the null zone is controlled by estimating strength of an interference signal, and dynamically varying the size of the null zone based on the estimated strength of the interference signal. As a result, the amplifier rarely saturates, regardless of signal strength. The invention is useful to reduce the harmful effects of jamming or interference.

27 Claims, 5 Drawing Sheets

OTHER PUBLICATIONS

A. Gosser and M. Sust, "Adaptive Interference Rejection in a Digital Direct Sequence Spread Spectrum Receiver," MILCOM '89 Session on Interference Suppression, Bedford, Mass. (Oct. 1989).

Ralph F. Guertin, "Narrowband Interference Suppression in a Spread-Spectrum System Using Vector Space Methods," MILCOM '89 Session on Interference Suppression, Bedford, Mass. (Oct. 1989).

Eric D. Adler and Michael S. Patterson, "Adaptive Interference Rejection for Wide-Band Systems," MILCOM '89 Session on Interference Suppression, Bedford, Mass. (Oct. 1989).

George J. Bloor and Robert P. Higgins, "Transient Response and Design Methodology of an Applebaum Adaptive Filter,"MILCOM '89 Session Interference Suppression, Bedford, Mass. (Oct. 1989).

R. Mendoza, J. H. Reed and T. C. Hsia, "Interference Rejection Using a Hybrid of a Constant Modulus Algorithm and the Spectral Correlation Discriminator," MILCOM'89 Session on Interference Suppression, Bedford, Mass. (Oct. 1989).

Bong Woon Lee and Dr. Joseph E. Essman, "On Interference Suppression using Complementary Filters in DS-SSS," MILCOM '89 Session on Interference Suppression, Bedford, Mass. (Oct. 1989).

Rajiv Vijayan and H. Vincent Poor, "Nonlinear Techniques for Interference Suppression in Spread-Spectrum Systems", IEEE Transaction on Communications, vol. 38, No. 7, Jul. 1990.

Nelson M. Blachman, "Detectors, Bandpass Nonlinearities, and Their Optimization: Inversion of the Chebyshev Transform", IEEE Transactions on Information Theory, vol. IT-17, No. 4, Jul. 19, 1971.

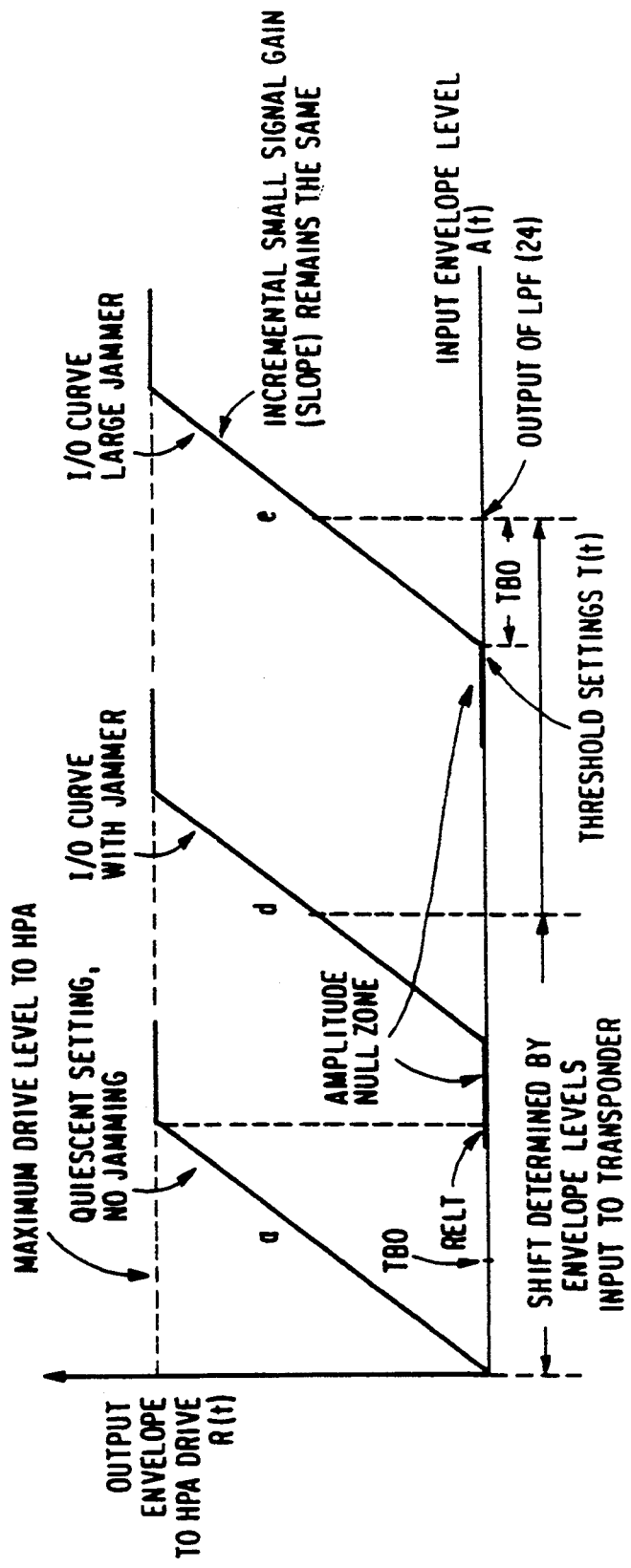

AUTOMATIC GAIN CONTROL FOR REDUCING EFFECTS OF JAMMING

DESCRIPTION OF THE RELATED ART

1. Field of the Invention

The present invention relates to an improved automatic gain control for an amplifier. More particularly, the present invention relates to an automatic gain control device which discriminates between wanted and unwanted signals based solely on amplitude of incoming signals.

2. Description of the Related Art

Conventional gain control for incoming signals to a transponder of a satellite communications system operate to adjust the gain of a power amplifier such that incoming signals are within the linear range of the transponder's power amplifier. Incoming signals to a transponder are subjected to natural or man-made interferences. Jamming is a form of strong man-made interference.

FIG. 1A illustrates a conceptual block diagram of a conventional gain control device. The incoming up-link signals are mixed with a local oscillator LO at a mixer 2 to shift the center frequency to the down-link. The incoming signals output from the mixer 2 are then supplied to a power meter 4 and a drive signal generation unit 6. The power meter 4 monitors or predicts the incoming signal strength of the incoming signals and outputs a power level control signal to again state setting unit 8. Alternatively, the power level control signal can be provided by ground commands from a ground station. The gain setting unit 8 receives the power level control signal end makes a decision as to which gain state should be used in the drive signal generation unit 6. The drive signal generation unit 6 receives the incoming signals and, depending on which gain state was selected by the gain state setting unit 8, produces a drive signal which is supplied to a high-power amplifier (HPA) 10 which amplifies the incoming signals in accordance with the selected gain state.

FIG. 1B is a graph illustrating the input/output (I/O) characteristics of the drive signal generation unit 6. In particular, the graph illustrates the relationship between an input envelope level and an output envelope level. Hence, FIG. 1B illustrates the signal envelope transfer characteristics of the drive signal generation unit 6. Note, all amplitude levels shown in FIG. 1B are absolute, not dB.

Any narrowband signal can be represented by an envelope function $A(t)$, a phase function $\alpha(t)$ and a center frequency $f_0$, see e.g., C. W. Helstrom, "Statistical Theory of Signal Detection," Pergamon Press, Oxford, 1968, Chapter 2. Accordingly, a composite input signal takes the form of:

$$A(t) \cos (2\pi f_0 t + \alpha(t))$$

The function of gain control is to adjust the gain of the power amplifier to keep the drive signal within the linear portion of an amplifier. According to conventional gain control, the input/output (I/O) characteristic is linear over a portion of its range as shown in FIG. 1B. Note, all curves a, b, and c shown in FIG. 1B begin at the origin of the graph illustrated in FIG. 1B with zero input yielding zero output. The I/O characteristic increases up to the point where the HPA 10 begins to saturate (i.e., maximum drive level). FIG. 1B illustrates three separate I/O characteristics, namely, curves a, b and c. Curve a shows a high gain condition, curve b shows a medium gain condition, and curve c shows a low gain condition. When the drive signal generation unit 6 is operated in a high-gain condition, the linear portion of curve a has a steep slope, which provides more amplification for small signals. However, when larger signals are detected or predicted at the input by the power meter 4, the gain state setting unit 8 causes the drive signal generation unit 6 to reduce the gain. This type of variable gain control can be obtained by the drive signal generation unit 6 by simply inserting or removing attenuators.

Thus, the presence of a jammer, or even the threat of a jammer, is enough to cause transponder capture (reduced wanted signal on the down-link) and signal-to-noise reduction. Further, when the jammer drives operation of the amplifier into saturation, small signal suppression will occur which inflates the Jammer-to-Signal (J/S) ratio appearing at the amplifier output and further reduces the signal-to-noise ratio.

In general, there are numerous harmful effects which occur on a satellite communications link with jamming. One of the harmful effects is the creation of intermodulation distortion falling in-band with wanted signals. This occurs even without jamming in any non-regenerative transponder operating with multiple inputs such as a Frequency Division Multiple Access (FDMA) transponder. A second harmful effect is power suppression of wanted signals by unwanted signals. A third harmful effect is transponder capture which shifts most of the transponder's output power over to the largest signals. A fourth harmful effect is reduction of signal-to-noise ratio (SNR) after demodulation of the received signal on the ground.

Every non-regenerative transponder, which includes most commercial and military satellites, will suffer from a signal-to-noise ratio reduction when jammed, and unless the satellite has sophisticated on-board demodulation equipment, which very few have, they will also experience the undesired effects of power suppression and transponder capture as described above.

SUMMARY OF THE INVENTION

It is an object of the present invention to substantially eliminate the harmful effects which occur on a satellite communications link due to jamming.

It is another object of the present invention to control amplification and saturation conditions in an amplifier so that the amplifier rarely saturates, regardless of incoming signal strength.

It is another object of the present invention to provide an automatic gain control device which discriminates between jammed and unjammed signals based on the measured envelope of the incoming signals.

It is a further object of the present invention to dynamically control the size of a null zone in a drive signal for an amplifier based on a measurement the envelope of incoming signals.

It is yet another object of the present invention to provide an automatic gain control device which operates a transponder in a conventional manner when jamming is not present.

The above and other objects are achieved by combining some features of conventional automatic gain control with a novel method of creating a drive signal for an amplifier. The method controls the size of a null zone in the drive signal for an amplifier according to the following steps: estimating the envelope of an interference signal, and determining the size of the null zone based on the estimated strength of the interference signal and the maximum strength of a wanted signal. The automatic gain control device includes: an input antenna for receiving an incoming signal, a broadband envelope meter for determining signal strength of the incoming signal, prediction unit for predicting the size of an unwanted component of the incoming signal, and a null zone adjustment unit for dynamically controlling the size of a null zone in a drive signal for an amplifier in accordance with the size of the of the unwanted component of the incoming signal.

BRIEF DESCRIPTION OF THE DRAWINGS

The invention will be more clearly understood from the following description in conjunction with the accompanying drawings, wherein:

FIG. 2B is a graph illustrating input/output characteristics of a drive signal generation unit according to the first embodiment of present invention;

DETAILED DESCRIPTION OF THE PREFERRED EMBODIMENTS

Figure 1A:
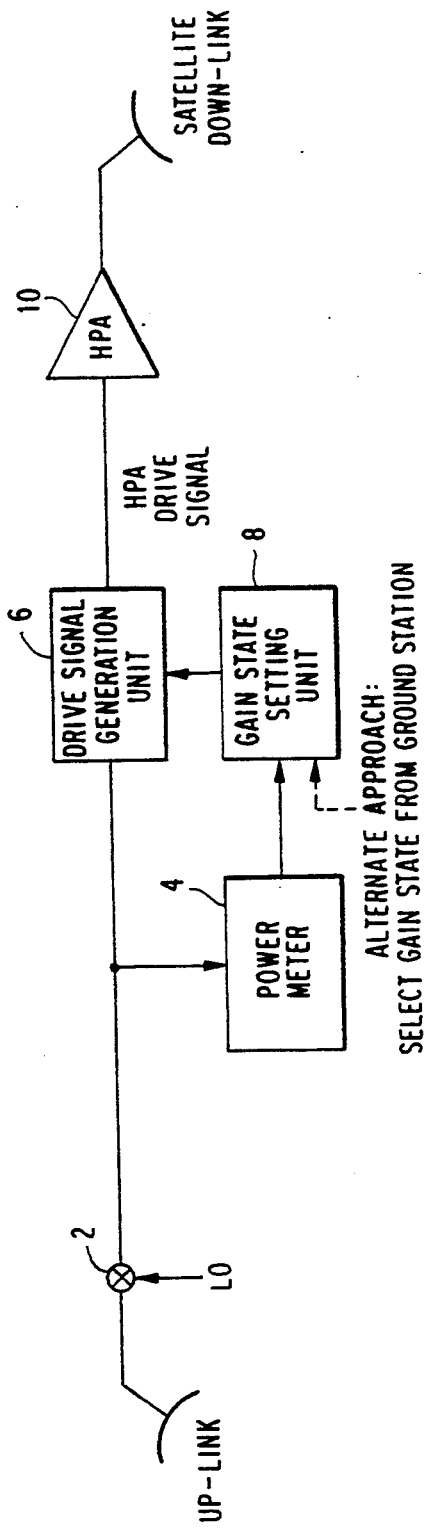
FIG. 1A is a conceptual block diagram illustrating a conventional gain control device.
Figure 1B:
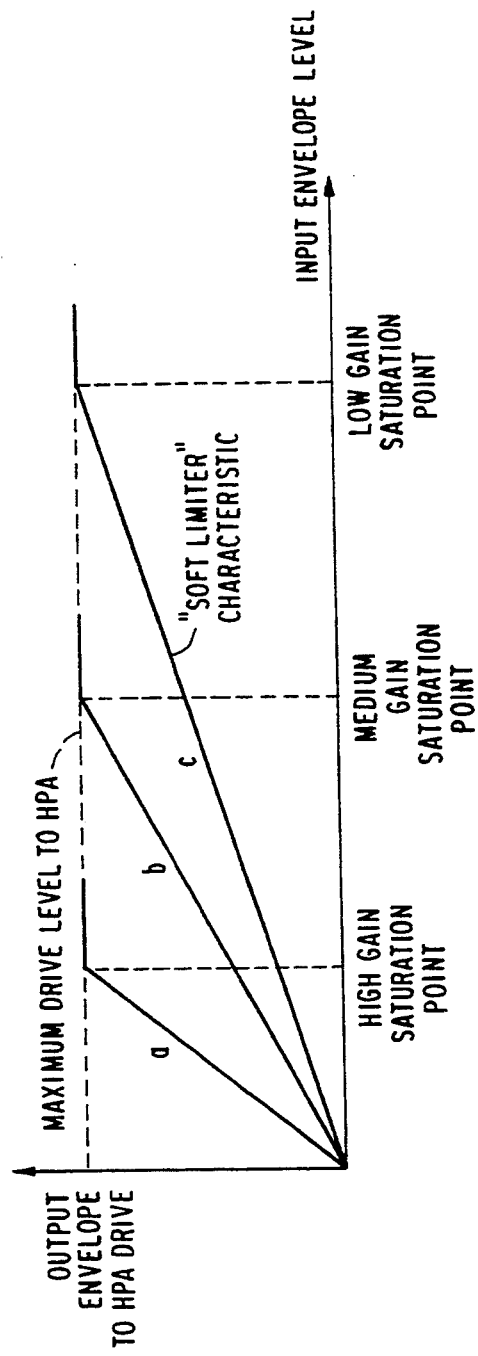
FIG. 1B is a graph illustrating the input/output characteristics of a conventional drive signal generation unit.

The present invention functions to control the amplification and saturation conditions of an amplifier so that the amplifier rarely saturates, regardless of the incoming signal strength. No matter how high the jamming is, the present invention is able to obtain a small signal enhancement relative to the jammer, whereas conventional gain control would provide small signal suppression.

The present invention discriminates between jammed and unjammed signals based on amplitude, rather than other criteria such as spectral signature, direction of arrival or use of spread spectrum codes. Normally, the present invention is used in the front end of a transponder of a satellite system. However, it could also be used in the front end of any amplifying device which is expected to experience jamming. The present invention is also a broadband device which does not frequency-distort the transponder's passband, nor require modification of existing ground station formats.

The basic concept of the present invention combines a broadband envelope measurement of the incoming signals together with a dynamic, nonlinear amplifier to prevent the amplifier from saturating by adaptively allocating the linear range of the amplifier. For best tracking results, the broadband envelope measurement must react quickly to changes in the envelope of the incoming signals so that the size of the null zone can be updated almost simultaneously with changes in the envelope of the incoming signals. Alternatively, the size of the null zone can be updated based on measurements of the average power instead of the envelope measurements. Hence, the term strength or signal strength as used herein with reference to signals is defined as including both envelope level and power level.

The present invention yields a largely improved J/S ratio as compared with the prior art. For example, where a conventional system would have a 6 dB small signal suppression and down-link power robbing, a system according to the present invention can have a small signal enhancement relative to the jammer by tens of dB and can almost eliminate the down-link power robbing. The J/S improvement depends primarily on the jammer's envelope dynamics not on its modulation or spectrum, thus it works for both FDMA signals and Code Division Multiple Access (CDMA). A constant envelope jammer is the easiest to reduce with the null zone device, regardless of its modulation or bandwidth.

The present invention has applications in both military and commercial satellites. Military satellites can be protected from a jamming attack. Also, the present invention will reduce dependence on well know anti-jamming techniques, such as exploiting spread spectrum bandwidth, antenna nulling, transmitting at high power, and reducing data rate. One commercial application that does not involve a jamming scenario is to automatically adjust a transponder's operating point for users who do not tightly maintain control of their up-link power. Another commercial application is creation of a dual-purpose military/commercial transponder package on-board a commercial satellite.

Besides satellites, the present invention has other commercial uses. One such use is in a mobile phone system to substantially eliminate the "near-far" problem. Although the embodiments of the present invention discussed below are satellite applications, further discussion on non-satellite applications is also provided below.

Figure 2A:
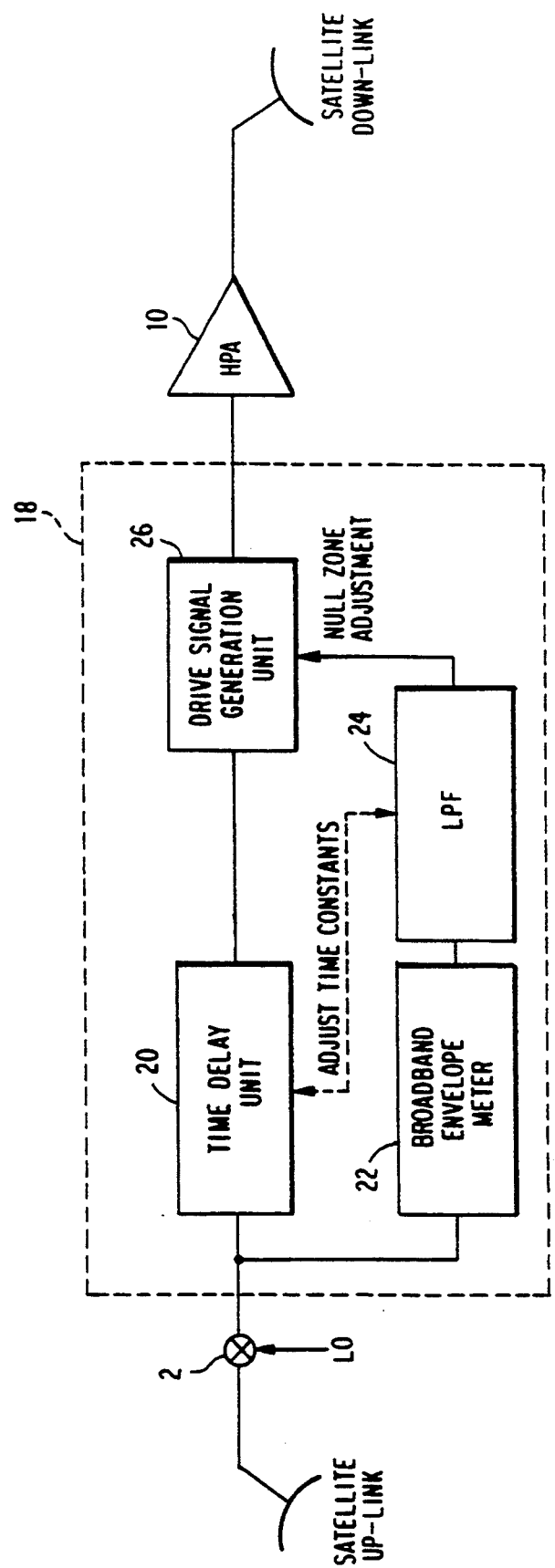
FIG. 2A is a block diagram illustrating a first embodiment of the present invention.

FIG. 2A illustrates a block diagram of a first embodiment of the present invention. The embodiment includes an automatic gain control device 18 and a high-power amplifier (HPA) 10. The automatic gain control device 18 receives incoming signals which have been amplified in a transponder's front-end low noise amplifier and frequency shifted by the local oscillator LO, and outputs a drive signal to a high power amplifier 10.

The automatic gain control device 18 includes a broadband envelope meter 22 which rapidly detects the total envelope level of the incoming signal. The envelope level signal is supplied to a low-pass filter 24 for smoothing. The bandwidth of the low-pass filter 24 is generally chosen to be some fraction of the transponder's total bandwidth. The low-pass filter 24 outputs a filtered envelope level signal. Experimentation with different types of amplitude-agile jamming signals and low pass filters has shown that the low pass filter bandwidth should be set within the approximate range of 5% to 25% of the transponder bandwidth.

A time delay unit 20 receives the incoming signals and delays them to compensate for the group delay associated with the Low-pass filter 24. The delayed signals from the time delay unit 20 are supplied to a drive signal generation unit 26 which produces the drive signal for the HPA 10. The dotted line in FIG. 2A represents a one-time adjustment of the time delay unit 20 whereby the low-pass filter 24 informs the delay unit 20 of the delay associated with the low-pass filter 24.

Accordingly, the present invention creates a dynamically controlled null zone in the drive signal by shifting the normal input/output (I/O) linear characteristic in response to measured input envelope levels. When a large signal envelope is detected, the linear portion of an I/O curve will be shifted to the right, creating a null zone of input amplitudes producing zero output.

FIG. 2B illustrates transfer characteristics of the drive signal generation unit 26. FIG. 2B is a graph illustrating the relationship between input envelope levels and output envelope levels depending on the presence of jamming. Specifically, the drive signal produced under quiescent circumstances (no jamming) follows the transfer characteristics of curve a. When signals that are larger that the maximum level of the wanted signals are detected by the broadband envelope meter 22, the linear portion of the I/O will be shifted to the right without a change in slope as shown in FIG. 2B, thus creating a null zone of input amplitudes producing zero output. In particular, the drive signal produced during moderate jamming follows the transfer characteristics of curve d. When large jamming is present, the null zone is increased and the drive signal follows the transfer characteristics of curve e. Thus, the automatic gain control device 18 of the present invention can be thought of as an amplitude-agile null zone device which varies in response to the measured envelope level of the incoming signal.

In the event an amplitude-agile jammer appears, the broadband envelope meter 22 and the low-pass filter 24 will detect the changes and will drive the linear segment of the I/O characteristics to the left and right so that the composite envelope stays within the linear portion of the I/O characteristics most of the time. The net effect is to keep the incremental small-signal gain the same regardless of the jamming level by placing the linear portion of the I/O characteristics where the smaller wanted signals have a greater chance to influence the composite output.

Figure 3:
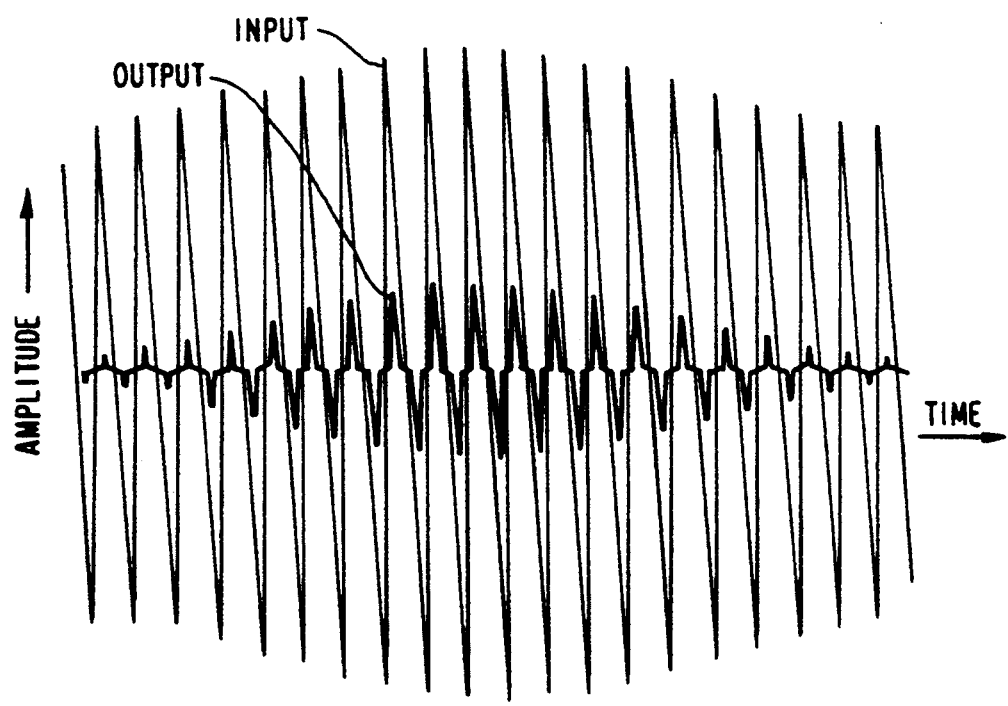
FIG. 3 is a diagram illustrating the effect of null zone amplification of a signal.

FIG. 3 is a diagram illustrating the actual effect of null zone amplification of a signal. FIG. 3 provides an example of an output signal for the drive signal generator 26. In particular, FIG. 3 shows the effect of a fixed null zone amplifier on the sum of a large unmodulated carrier wave and a small unmodulated carrier wave. This type of device is referred to as a "center stripper" because it removes the central portion of the RF cycle without effecting the envelope shape. Note that if one considers the small signal as "wanted" and the large signal as "jammer", then the envelope contains most of the useful information about the wanted signal. Accordingly, the RF center portion can be eliminated, and the useful amplitude variations can be maintained.

Figure 4:
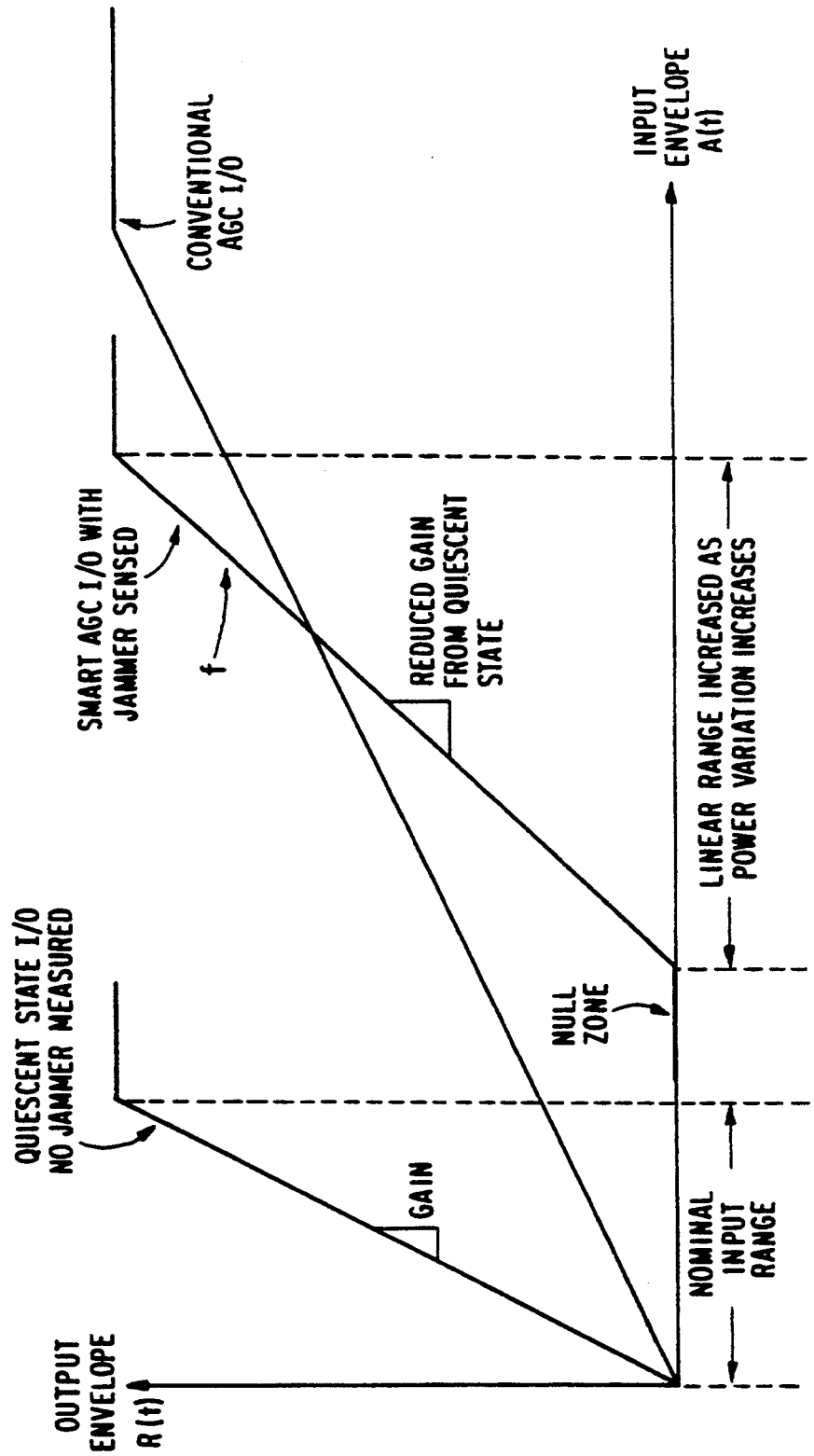
FIG. 4 is a graph illustrating input/output characteristics of a drive signal generation unit according to a second embodiment of the present invention.

FIG. 4 is a graph illustrating I/O characteristics of the second embodiment of the present invention. The second embodiment is structurally similar to the first embodiment, except that the drive signal produced by the automatic gain control device 18 may have differing slopes as well as differing null zone sizes.

The second embodiment is particularly desirable when a power-agile jammer makes tracking difficult. If the envelope measurement uncertainty (variance) is too large, the slope of the linear portion of the I/O characteristic can be reduced as in the transfer characteristics of curve f. The final selection of parameters, the size of the null zone and the slope of the linear portion, are optimized as a function of the power level and the power agility of the incoming signals. Accordingly, the linear range of the linear portion can be increased as the power agility increases. Hence, according to the second embodiment, the size of the null zone and the slope of the linear portion are both optimized as a function of power agility and power level.

The operation of the drive signal generation circuit is as follows. The drive signal generation unit 26 performs a tracking operation to set a null zone threshold T(t). Improper setting of the null zone threshold can result in eliminating both the wanted and unwanted signals or leaving too much of the unwanted signal, thus rendering operation ineffective. Experiments have shown that the null zone tracking operation (estimation) described below allows tracking of large, power-agile interference signals (i.e., jamming signals) in real time. The null zone tracking device operation performs several major tasks, including: estimating the magnitude of the jammer, using a predetermined maximum unjammed signal envelope called null zone threshold back-off (TBO) and using a predetermined desired residual envelope limiting threshold (RELT), computing an actual null zone threshold T(t) which could include floor limiting to force the threshold level to zero when the estimated jammer magnitude is less then or near the null zone threshold back-off (TBO) and limiting the residual signal after the null zone amplification. FIG. 2B illustrates an example of the null zone threshold back-off (TBO), the residual envelope limiting threshold (RELT), and the null zone threshold T(t). Note, the residual envelope limiting threshold (RELT) with unity slope equals the maximum drive level of the high power amplifier (HPA) 10.

The estimation of the magnitude of the jammer is performed based on the envelope level as monitored by the broadband power meter 22 and smoothed by the low-pass filter 24. The null zone threshold back-off (TBO) and the residual envelope limiting threshold (RELT) are then defined as follows:

$$TBO = MAX(B(t)), \text{ and}$$

$$RELT = \gamma \cdot TBO$$

where B(t) is the wanted signal envelope, and $\gamma$ is a safety factor which provides dynamic range to account for uncertainty in the measured strength of the jammer. Typically, $\gamma = 2$ is sufficient to handle most cases.

The input signal consisting of the wanted and the unwanted (i.e., jammer) signals is written as:

$$A(t)e^{j\alpha(t)} = B(t)e^{j\beta(t)} + J(t)e^{j\phi(t)}$$

where A(t), B(t), and J(t) are the composite input signal, wanted signal, and jammer signal envelopes, respectively, and $\alpha(t)$, $\beta(t)$, and $\phi(t)$ are their phases. The threshold for the null zone can then be defined as $$T(t) = J(t) - TBO$$

where $$J(t) = LPF(A(t)) \quad \text{if } A(t) > TBO, \text{ or}$$
$$\phantom{J(t)} = TBO \quad \text{otherwise}$$

The quantity J(t) is, in effect, an estimate of the jammer's envelope J(t). The flooring operation which sets J(t) to TBO when A(t)<TBO, forces the null zone threshold T(t) to zero. This ensures that the center stripping operation by the null zone amplifier is eliminated, thereby passing the input signal unaffected whenever it is within the normal dynamic range.

Suppression of the large unwanted signal is achieved by subtracting the null zone threshold T(t) from the composite drive signal envelope A(t) while retaining the composite phase α(t). The subtraction yields a residual signal envelope R(t) which is linearly amplified up to the residual envelope limiting threshold (RELT) which acts as a limiting value. Specifically, the residual signal envelope R(t) is computed as follows:

$$
\begin{aligned}
R(t) &= A(t) - T(t) && \text{if } A(t) \geq T(t) \text{ and } A(t) - T(t) \leq RELT \\
&= RELT && \text{if } A(t) - T(t) > RELT, \text{ or} \\
&= 0 && \text{if } A(t) < T(t)
\end{aligned}
$$

and the drive signal S(t) output from the automatic gain control device 18 is computed as:

$$S(t) = G \cdot R(t) e^{j\alpha(t)}$$

where G is the slope of the linear section of the null zone amplifier. The drive signal S(t) is then fed into the transponder amplifier.

The use of a low-pass filter to compute J(t) as shown above is a practical, cost effective technique to track the jammer signal envelope, provided the jammer's envelope bandwidth is less than that of the low pass filter. However, if the jammer's envelope bandwidth is larger, such an estimation technique may be insufficient. Increasing the bandwidth of the low-pass filter may help somewhat, but a loss in effectiveness will occur if the bandwidth gets too large because the tracking begins to follow fluctuations in the wanted signal.

In any event, the best results are obtained when the most accurate estimate of the jammer signal envelope is used. The low-pass filter technique is effective and practical when the jammer envelope is not too amplitude agile. However, when the jammer envelope is quite agile it would be better to use a microprocessor instead of a low-pass filter because the microprocessor would be better able to estimate or predict the jammer envelope.

Experiments have shown that the present invention consistently produces substantial improvements in J/S compared with conventional techniques even when the jammer changes from constant envelope to amplitude agile. In a jamming environment which is fundamentally unpredictable, this robustness of the invention is a distinct advantage.

Experiments regarding the present invention have also shown that the output J/S reaches a level of about 6 dB even when the input J/S increases without limit, as long as the jammer envelope does not change. Thus, the present invention has the ability to eliminate the drawdown phenomenon whereby an ever increasing jammer can eventually make the transponder unusable.

Although the transfer characteristics have been described and illustrated (FIGS. 2B and 4) as containing a linear portion, this is the ideal characteristic of the drive signal generating unit 26. However, practically speaking, this so-called linear region is a quasi-linear region that could be concave up, concave down, compound or even vertical. Generally, the so-called "linear portion" is merely a transition region of any shape from a null zone to a saturation region. If the quasi-linear portion is vertical, it is known as a biased hard limiter.

The present invention is also useful in a non-jammed environment such as uncontrolled multiple access in a FDMA transponder. Specifically, it could be used to avoid notification of ground stations each time a new user enters the transponder and the envelope peaks exceed saturation. However, for this technique to work, each user would have to have some reserve margin in the link's performance to account for the automatic carrier level adjustment.

The present invention is also useful in certain mobile phone systems employing Code Division Multiple Access (CDMA). A well-known problem which could occur in CDMA cellular phone systems is the "near-far" problem in which a transmitting mobile unit which is near a receiving station acts like a jammer. The dynamically determined null zone will still be set in accordance with the estimated jammer power as described above. However, the low-pass filtering bandwidth could be reduced somewhat since the magnitude of the jamming signals from mobile units will not be as amplitude agile as those of deliberate military jammers. Power suppression can be reduced and signal-noise ratio can be improve, thereby making the "near-far" problem much less severe.

Many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, accordingly all suitable modifications and equivalents may be resorted to as falling within the scope of the invention.

What is claimed is:

1. A method for controlling the size of a null zone in a drive signal for an amplifier, comprising:
   (a) estimating strength of an interference signal; and
   (b) dynamically varying the size of the null zone based on the estimated strength of the interference signal.

2. A method as recited in claim 1, wherein said estimating in step (a) comprises:
   (i) receiving a composite input signal; and
   (ii) low-pass filtering the envelope of the composite input signal to estimate the strength of the interference signal.

3. A method as recited in claim 1, wherein the amplifier resides in a satellite transponder in a jamming environment, and the interference signal is a jamming signal.

4. A method as recited in claim 1, wherein said dynamically varying in step (b) comprises the step of determining the size of the null zone by subtracting the maximum strength of a wanted signal from the estimated strength of the interference signal.

5. A method as recited in claim 1, wherein the drive signal includes a transition region having a slope, a saturation zone and the null zone, and
   wherein said method further comprises step (d) adjusting the slope of the transition region.

6. A method for suppressing a jammer signal in a satellite transponder using an amplifier, comprising:
   (a) receiving a composite input signal including the jammer signal and a wanted signal;
   (b) estimating strength of the jammer signal;
   (c) using a predetermined maximum amplitude of the wanted signal;
   (d) suppressing the jammer signal by subtracting the magnitude of the estimated strength of the jammer signal less the predetermined maximum amplitude of the wanted signal from the composite input signal to produce a residual signal; and (e) amplifying the residual signal.

7. A method as recited in claim 6, wherein the amplifier has a quasi-linear amplification region and a saturation amplification region, and wherein said suppressing step (e) holds the residual signal substantially within the quasi-linear amplification region of the amplifier.

8. A method as recited in claim 7, wherein said method further compresses step (f) adjusting the slope of the quasi-linear amplification region based on an amount of uncertainty in the estimate of the strength of the jammer signal.

9. A method as recited in claim 6, wherein said estimating step (b) comprises the step of low-pass filtering the composite input signal to estimate the strength of the jammer signal.

10. A method as recited in claim 6, wherein said method further comprises the step of (f) determining the size of a null zone of said residual signal based on the estimated strength of the jammer signal and the maximum amplitude of the wanted signal.

11. A method for suppressing unwanted signals in a communication apparatus which produces a drive signal having quasi-linear transfer characteristics for an amplifier, comprising:

(a) receiving incoming signals, the incoming signals including wanted signals and unwanted signals.

(b) estimating the level of the unwanted signals; and (c) shifting a quasi-linear region of transfer characteristics of the drive signal based on the level estimated in step (b) such that incremental variation in envelope caused by the wanted signals are primarily within the quasi-linear region of the transfer characteristics of the drive signal.

12. A method as recited in claim 11, wherein said shifting step (c) produces a null zone in the transfer characteristics of the drive signal, and the unwanted signals are primarily within the null zone in the transfer characteristics of the drive signal.

13. A method as recited in claim 11, wherein the transfer characteristics further includes a saturation region, and wherein said method further comprises the step of (d) adjusting the slope of the quasi-linear region to account for uncertainty in the estimate of the level of the unwanted signals.

14. A method for suppressing a jamming signal in a communication apparatus having an amplifier, comprising:

(a) receiving an incoming signal;

(b) determining signal strength of the incoming signal;

(c) predicting the level of an unwanted component of the incoming signal;

(d) comparing the level of the unwanted component with a threshold value; and (e) producing a drive signal for the amplifier, the drive signal having only a transition portion and a saturation region %hen the level of the unwanted component does not exceed the threshold value by a predetermined amount, and the drive signal having a transition portion, a null zone and a saturation zone when the level of the unwanted component does exceed the threshold value by a predetermined value.

15. A method as in claim 14, wherein the incoming signal includes wanted and unwanted signals, and wherein the threshold valve is a nominal maximum level of the wanted signals.

16. An automatic gain control circuit for an amplifier, comprising:

an input means for receiving an incoming signal;

a broadband envelope meter for determining signal strength of the incoming signal;

prediction means responsive to the envelope meter for predicting the level of an unwanted component of the incoming signal; and null zone adjustment means responsive to said input signal and to said prediction means for producing a drive signal for the amplifier based on the incoming signal and for dynamically controlling the size of a null zone in the drive signal in accordance with the level of the unwanted component of the incoming signal.

17. A circuit as recited in claim 16, wherein said circuit is within a satellite transponder.

18. A circuit as recited in claim 16, wherein said circuit is within a base station of a mobile phone system employing code division multiple access modulation.

19. A circuit as recited in claim 16, wherein said prediction means comprises a low-pass filter, operatively connected between said broadband envelope meter and said null zone adjustment means, for low-pass filtering the signal strength of the incoming signal.

20. A circuit as recited in claim 16, wherein said prediction comprises a digital processor.

21. An anti-jamming device for a satellite transponder having an amplifier, comprising:

reception means for receiving incoming signals;

power level detection means for detecting envelope levels of the incoming signals to produce an envelope level signal;

low-pass filter means for low-pass filtering the envelope level signal;

delay means for delaying the incoming signals to compensate for group delay characteristics of said low pass filter means; and null zone adjustment means for producing a drive signal for the amplifier based on the delayed incoming signal and for dynamically controlling the size of a null zone in the drive signal in accordance with the filtered envelope level signal.

22. A device as recited in claim 21, wherein the drive signal has adaptable input/output characteristics, the input/output characteristics having the null zone, a quasi-linear portion and a saturation zone.

23. A device as recited in claim 22, wherein said null zone adjustment means adjusts the linear portion of the drive signal to follow the filtered envelope level signal.

24. A device as recited in claim 23, wherein when the envelope level of the incoming signals increases, the size of the null zone increases, and when the envelope level of the incoming signals decreases, the size of the null zone decreases.

25. A device as recited in claim 22, wherein when the envelope level of the incoming signals is less than a predetermined value, no null zone is present.

26. A cellular mobile base station receiver, comprising:

input means for receiving an incoming signal; and an automatic gain control device for an amplifier, said automatic gain control device comprises:

a broadband envelope meter, operatively connected to said input means, for determining signal strength of the incoming signal;

prediction means, operatively connected to said broadband envelope meter, for predicting the signal strength of an interference component of the incoming signal; and null zone adjustment means, operatively connected to said prediction means and said input means, for producing a drive signal for the amplifier based on the incoming signal and for dynamically controlling the size of a null zone in the drive signal in accordance with the signal strength of the interference component of the incoming signal.

27. A device an recited in claim 26, wherein when the signal strength of the interference components increases, the size of the null zone increases, and when the signal strength of the interference components decreases, the size of the null zone decreases.

* * * * *

UNITED STATES PATENT AND TRADEMARK OFFICE
CERTIFICATE OF CORRECTION

PATENT NO.    : 5,379,445
DATED         : January 3, 1995
INVENTOR(S)   : Donald S. Arnstein et al It is certified that error(s) appears in the above-identified patent and that said Letters Patent is hereby corrected as shown below:

Column 1, line 30, change "again" to --a gain--.

Column 1, line 34, change "end" to --and--.

Column 2, line 59, insert --of-- between "measurement" and "the".

Column 3, line 13, delete "of the" second occurrence.

Column 4, line 20, change "know" to --known--.

Column 4, line 59, change "Low-pass" to --low-pass--.

Column 5, line 15, add "curve d and e" after "Fig. 2B"

Column 9, line 60, change "%hen" to --when--

UNITED STATES PATENT AND TRADEMARK OFFICE
CERTIFICATE OF CORRECTION

PATENT NO. : 5,379,445
DATED : January 3, 1995
INVENTOR(S) : Donald S. Arnstein, et al It is certified that error appears in the above-indentified patent and that said Letters Patent is hereby corrected as shown below:

Column 10, line 1, change "valve" to --value--.

Signed and Sealed this

Eighteenth Day of July, 1995

Attest:

BRUCE LEHMAN

Attesting Officer      Commissioner of Patents and Trademarks